US008650855B2

(12) United States Patent
Maalioune

(10) Patent No.: US 8,650,855 B2
(45) Date of Patent: Feb. 18, 2014

(54) SYSTEM FOR CONTROLLING AT LEAST ONE ACTUATOR OF THE COWLINGS OF A TURBOJET ENGINE THRUST REVERSER

(75) Inventor: Hakim Maalioune, Orgeval (FR)

(73) Assignee: Aircelle, Gonfreville l'Orcher (FR)

( * ) Notice: Subject to any disclaimer, the term of this patent is extended or adjusted under 35 U.S.C. 154(b) by 1003 days.

(21) Appl. No.: 12/673,828

(22) PCT Filed: Jul. 7, 2008

(86) PCT No.: PCT/FR2008/000978
§ 371 (c)(1),
(2), (4) Date: Feb. 17, 2010

(87) PCT Pub. No.: WO2009/034246
PCT Pub. Date: Mar. 19, 2009

(65) Prior Publication Data
US 2011/0265446 A1 Nov. 3, 2011

(30) Foreign Application Priority Data
Aug. 20, 2007 (FR) ...................................... 07 05926

(51) Int. Cl.
*F02K 1/72* (2006.01)
(52) U.S. Cl.
USPC ...................................................... 60/226.2
(58) Field of Classification Search
USPC ............... 60/226.2, 230; 239/265.19, 265.23, 239/265.31, 265.27, 265.25; 244/110 B
See application file for complete search history.

(56) References Cited

U.S. PATENT DOCUMENTS

| 2,871,656 | A  | * | 2/1959  | Johnson        | 60/230     |
| 6,633,148 | B1 | * | 10/2003 | Klesing        | 318/445    |
| 7,319,300 | B2 | * | 1/2008  | Hahn           | 318/400.32 |
| 7,954,759 | B2 | * | 6/2011  | Marin Martinod | 60/226.2   |
| 2005/0257986 | A1 | * | 11/2005 | Kagei       | 180/404    |
| 2007/0147807 | A1 | * | 6/2007  | Schunke et al. | 388/903 |

FOREIGN PATENT DOCUMENTS

FR 2872223 A1 12/2005
WO 2006134253 A1 12/2006

OTHER PUBLICATIONS

FR 2872223 machine translation done May 2013.*
International Search Report PCT/FR2008/000978; Dated Mar. 16, 2009.

* cited by examiner

*Primary Examiner* — Ted Kim
(74) *Attorney, Agent, or Firm* — Brinks Gilson & Lione

(57) ABSTRACT

The control system of the invention includes at least one actuator (6) for a cowling (2), driven by at least one electric motor (7), and a control means (9) for the electric motor (7). The electric motor control means (9) includes a means for determining and/or estimating the outside temperature of the turbojet engine, the electric motor control means being adapted for adjusting the driving torque supplied by the electric motor on the basis of said outer temperature.

4 Claims, 3 Drawing Sheets

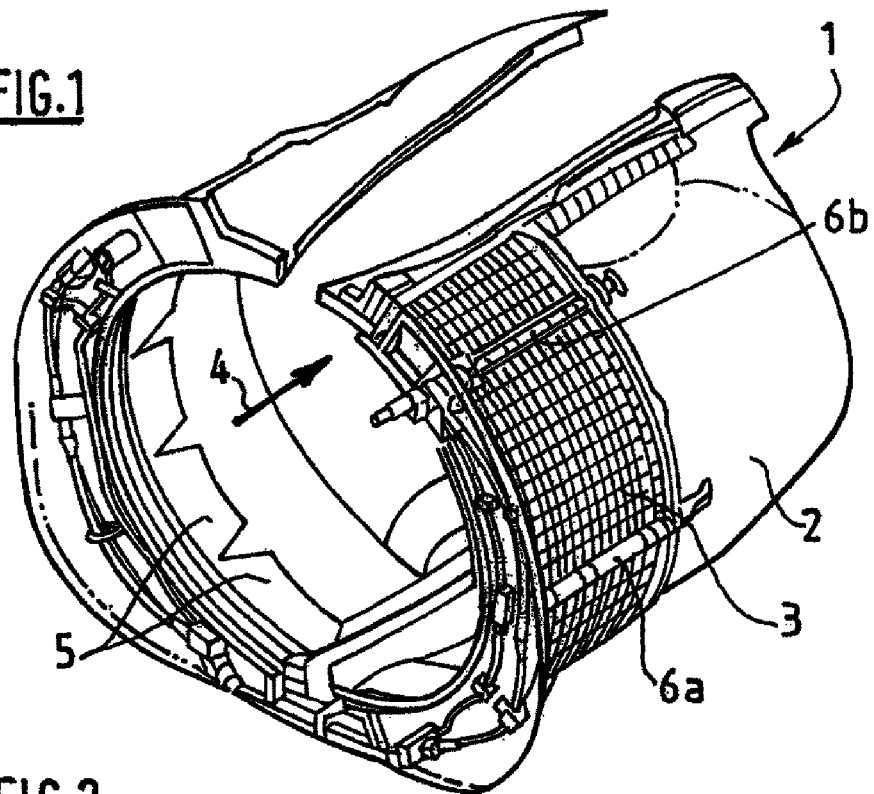
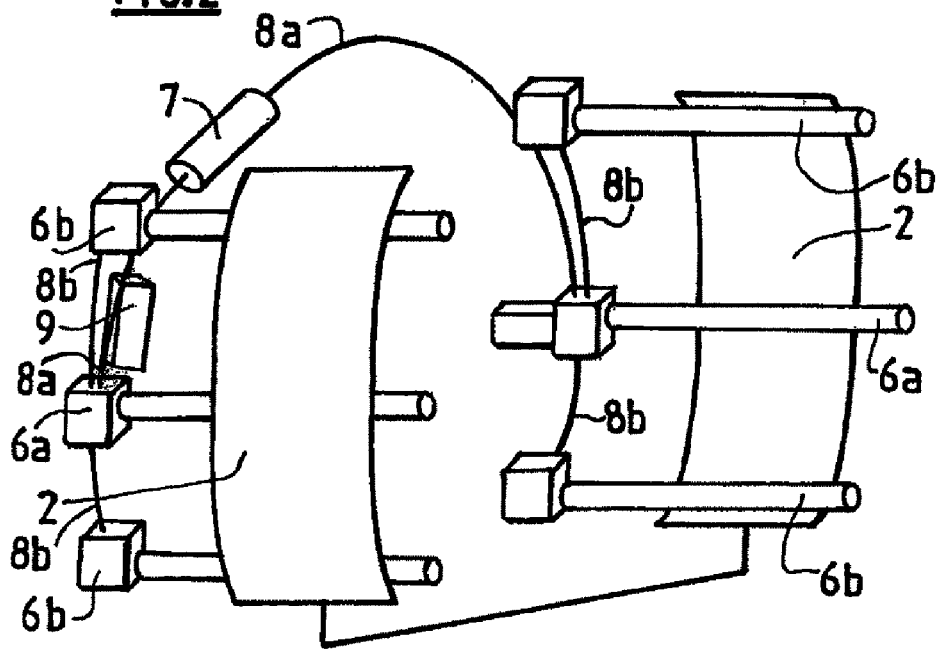

SYSTEM FOR CONTROLLING AT LEAST ONE ACTUATOR OF THE COWLINGS OF A TURBOJET ENGINE THRUST REVERSER

TECHNICAL FIELD

The present invention relates to a system for controlling at least one actuator for the cowling sections of a turbojet engine thrust reverser.

BACKGROUND

The role of a thrust reverser during the landing of an aircraft is to enhance the braking capacity of an aircraft by redirecting forward at least a part of the thrust generated by the turbojet engine. In this phase, the reverser obstructs the gas exhaust duct and directs the exhaust flow stream from the engine toward the front of the engine car, thus generating a counter-thrust which is added to the braking force of the aircraft wheels.

The means used for implementing this redirection of the flow stream varies depending on the type of reverser. However, in all cases, the structure of a reverser comprises mobile cowling sections moveable between, on the one hand, a deployed position in which they open up a passage in the engine car designed for the diverted flow stream and, on the other hand, a retracted position in which they close this passage. Furthermore, these mobile cowling sections can fulfill a diverter function or simply a function for activation of other diverter means.

In fin-array reverser systems, for example, the mobile cowling sections slide along rails in such a manner that, by sliding back during the opening phase, they uncover arrays of diverter fins disposed within the thickness of the engine car. A system of crank-rods connects this mobile cowling section to blocking doors which are deployed inside the exhaust channel and block the direct flow output. In door reversers, on the other hand, each mobile cowling section pivots so as to be made to block the flow stream and divert it and hence is active in this redirection.

Generally speaking, these mobile cowling sections are actuated by hydraulic or pneumatic jacks which require a high-pressure fluid transport system. This high-pressure fluid is conventionally obtained either by tapping off air from the turbojet engine in the case of a pneumatic system, or by taking fluid from the hydraulic circuit of the aircraft. Such systems require significant maintenance since the smallest leakage in the hydraulic or pneumatic system may be difficult to detect and risks having detrimental consequences both on the reversing and on the other parts of the engine car. Furthermore, owing to the reduced space available in the forward framework of the reverser, the installation and the protection of such a circuit are particularly difficult and cumbersome.

In order to overcome the various drawbacks associated with the pneumatic and hydraulic systems, the thrust reverser manufacturers have tried to replace them and, as far as possible, to equip their reversers with electromechanical actuators which are lighter and more reliable. Such a reverser is described in the document EP 0 843 089.

However, electromechanical actuators also exhibit several drawbacks which need to be resolved in order to take full advantage of the features they offer in terms of mass and volume gains.

In particular, under extreme temperature conditions, in other words for example for temperatures of around −40° C. or around 50° C., the torque delivered by the electric motor driving the electromechanical actuators can be insufficient for driving the latter and hence for enabling the mobile cowling sections to be moved.

Indeed, it has been observed that, under extreme temperature conditions, the electromechanical actuators require the electric motor driving the latter to deliver a torque greater than that delivered under normal temperature conditions in order to enable them to be driven.

Thus, under extreme temperature conditions, the operation of the thrust reverser may be compromised during the landing of an aircraft equipped with such a reverser.

One solution for overcoming this drawback would consist in adapting the electric motor in such a manner that it delivers a single torque high enough to allow the electromechanical actuators to be driven and hence the cowling sections of the reverser to be displaced under both normal temperature conditions and extreme temperature conditions.

However, for the electric motor to continuously deliver a high torque would lead to rapid wear of the electric motor and of the electromechanical actuators.

Moreover, the use of high currents has an impact on the reliability/lifetime of the control system power electronics.

The rapid wear of the electric motor and of the electromechanical actuators is all the more harmful as the delivery of a high torque is only necessary in a very few cases, since most of the time the control system is running under normal temperature conditions that do not require the delivery of such a torque.

BRIEF SUMMARY

The disclosure resides in resolving these drawbacks and, more particularly, in providing a system for controlling at least one actuator for the cowling sections of a turbojet engine thrust reverser allowing the reverser cowling sections to be displaced under extreme temperature conditions, while at the same time avoiding rapid wear-out of the actuator.

For this purpose, the present invention relates to a system for controlling at least one actuator for the cowling sections of a thrust reverser for a turbojet engine comprising:

at least one actuator for a cowling section driven by at least one electric motor, control means for the electric motor, characterized in that the control means for the electric motor comprise means for determining and/or estimating the temperature outside of the turbojet engine, the control means for the electric motor being configured for adjusting the driving torque delivered by the electric motor as a function of this outside temperature, and in that the determination and/or estimation means comprise temperature measurement means configured for measuring the temperature at the control means, the determination and/or estimation means being configured for determining the temperature outside of the turbojet engine as a function of the measured temperature.

The adjustment of the driving torque delivered by the electric motor as a function of the outside temperature allows, on the one hand, a low driving torque to be applied for normal temperature conditions and, on the other, a high driving torque to be applied only for extreme temperature conditions. This arrangement therefore allows rapid wearing of the actuator to be limited and also the operation of the thrust reverser under extreme temperature conditions to be guaranteed.

Furthermore, the fact that the determination and/or estimation means comprise temperature measurement means configured for measuring the temperature at the control means allows a determination of the outside temperature to be made using components localized in the control means situated on the turbojet engine or the engine car, without the need for remote sensors mounted outside of the propulsion assembly and the connection to these remote sensors.

Advantageously, the characteristic curve for the adjustment by the control means of the driving torque delivered by the electric motor as a function of the outside temperature comprises a set of levels corresponding to different ranges of temperature.

According to one embodiment of the invention, the value of the adjustment of the driving torque is determined at the start of an actuation phase for the duration of that actuation phase.

These arrangements allow the servo-control of the motor to be effected simply during the opening phase without taking into account modifications of the adjustment of the driving torque over the duration of the actuation phase, the changes in temperature being insignificant over the duration of the actuation phase.

BRIEF DESCRIPTION OF THE DRAWINGS

In any case, the invention will be well understood with the aid of the description that follows with reference to the appended schematic drawing showing, by way of non-limiting example, one embodiment of this control system.

FIG. 1 is a schematic partial perspective view of an engine car incorporating a fin-array thrust reverser.

FIG. 2 is a schematic representation of the mobile cowling sections and their actuation system.

Figure 3:
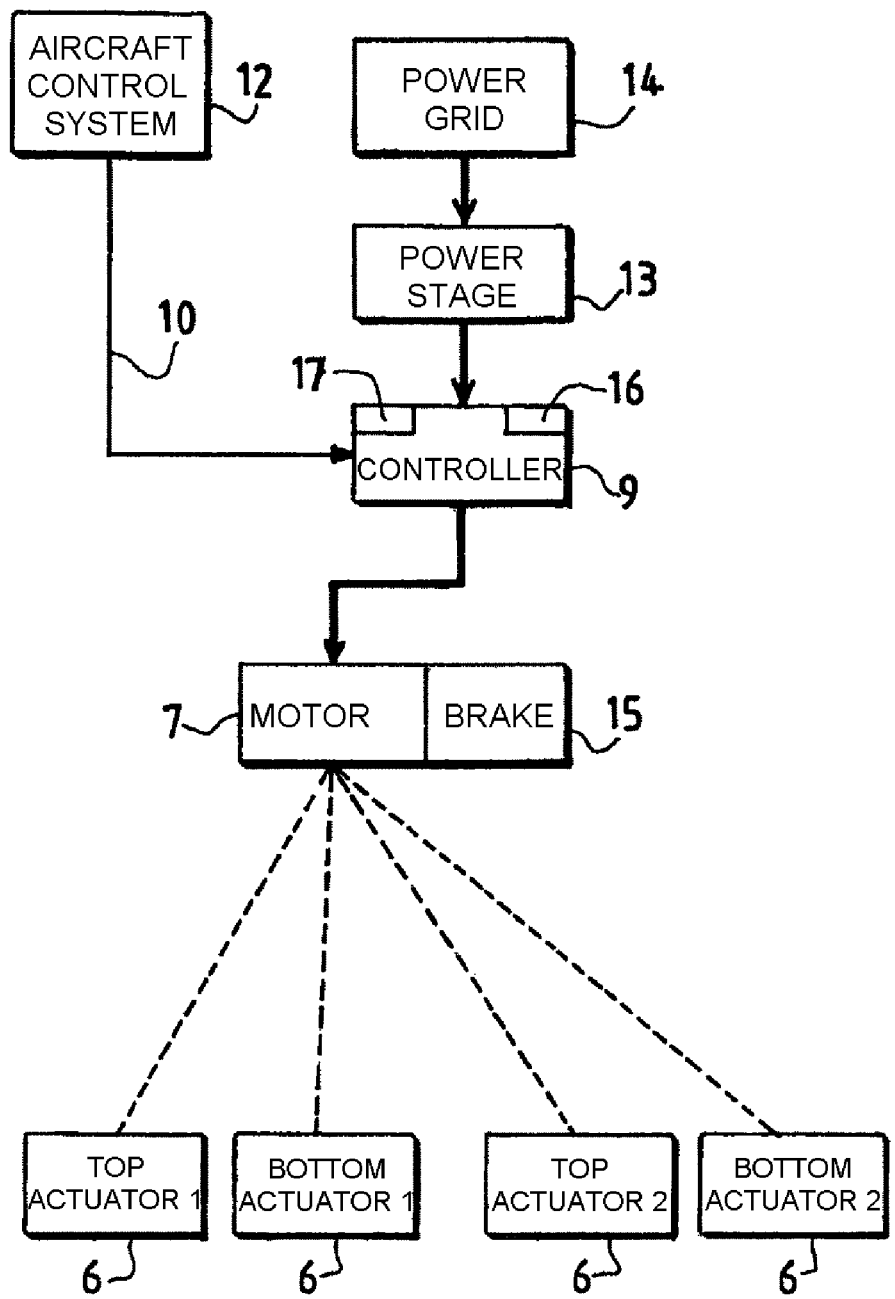
FIG. 3 is a schematic representation of the system for controlling the actuators of the mobile cowling sections.

Before describing one embodiment of the invention in detail, it is important to point out that the system described is not limited to one type of reverser in particular. Although illustrated by a fin-array reverser, the invention could be implemented with reversers of different design, notably those using doors.

FIG. 1 shows a schematic partial view of an engine car incorporating a thrust reverser 1. The turbojet engine is not shown. This thrust reverser 1 has a structure comprising two mobile semi-circular cowling sections 2 capable of sliding in order to uncover diverter fin arrays 3 placed between the mobile cowling sections 2 and a section of passage for the air flow stream 4 to be diverted. Blocking doors 5 are disposed inside the structure in such a manner as to be able to pivot and go from a position in which they do not block the passage of the air flow stream 4 to a position in which they block this passage. In order to coordinate the opening of the mobile cowling sections 2 with a blocking position of the blocking doors 5, the latter are mechanically connected to the mobile cowling section 2 by hinges and to the static structure by a system of tie rods (not shown).

The mobile cowling sections 2 are displaced along the outside of the structure by an assembly of jacks 6a, 6b mounted onto a forward frame inside which an electric motor 7 and flexible transmission shafts 8a, 8b are housed which are respectively connected to the jacks 6a, 6b in order to actuate them.

The actuation system for the mobile cowling sections 2 is shown on its own in FIG. 2. Each mobile cowling section 2 may be translated under the action of three jacks 6a, 6b, comprising a central jack 6a and two additional jacks 6b, actuated by a single electric motor 7 connected to control means 9, comprising a microcontroller. The power delivered by the electric motor 7 is first of all distributed to the central jacks 6a via two flexible transmission shafts 8a, then to the additional jacks 6b by flexible transmission shafts 8b.

According to one variant not shown, only two jacks—top and bottom—are used for each cowling section, actuated by a single electric motor connected to a control interface. The power delivered by the electric motor is distributed to the two top and bottom jacks via two flexible transmission shafts 8a.

FIG. 3 shows schematically a control system for actuating two cowling sections with, for each cowling section, two actuators—top and bottom.

As shown in FIG. 3, a control system for the actuators of a thrust reverser according to the invention comprises means for controlling the electric motor 7 composed of a microcontroller 9.

This microcontroller 9 is connected by communication means 10 to the control system 12 of the aircraft.

The control system also comprises a power stage 13 connected to the power grid 14 of the aircraft.

The microcontroller 9 enables an electric motor 7 and jacks or actuators 6 to be controlled as previously described. The motor also comprises a brake 15 also controlled by the microcontroller 9.

The microcontroller 9 comprises means for estimating the temperature outside of the turbojet engine. The estimation means comprise a temperature measurement sensor 16 configured for measuring the temperature at the microcontroller 9.

The estimation means also comprise means 17 for computing the temperature outside of the turbojet engine as a function of the temperature measured at the microcontroller 9.

The temperature outside of the turbojet engine is estimated by means of computation nomographs previously stored in the computation means 17.

Thus, the estimation means are configured for estimating the temperature outside of the turbojet engine as a function of the temperature measured at the microcontroller 9.

The microcontroller 9 is configured for adjusting the driving torque delivered by the electric motor 7 as a function of this estimated outside temperature.

The characteristic curve for the adjustment by the microcontroller 9 of the driving torque delivered by the electric motor 7 as a function of the estimated outside temperature comprises a set of levels corresponding to different ranges of temperature.

It should be noted that the value of the adjustment of the driving torque is determined at the start of an actuation phase for the duration of that actuation phase.

Figure 4:
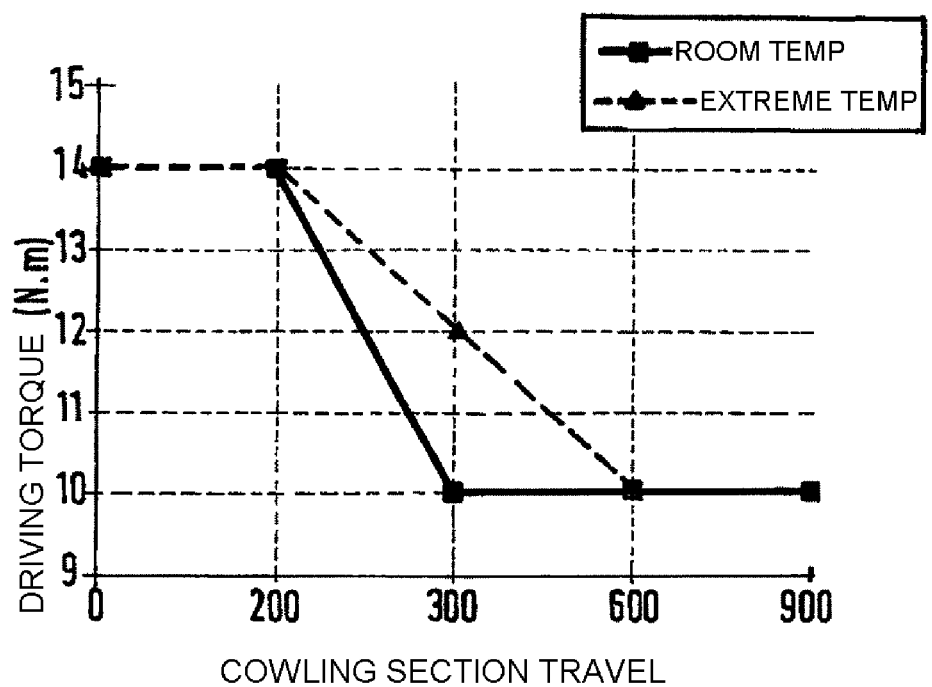
FIG. 4 shows two curves representing the variation of the driving torque as a function of the cowling section travel for two different values of temperature and for a given motor rating.

FIG. 4 shows two curves representing the variation of the driving torque as a function of the travel of the cowling sections for two different values of temperature, one corresponding to an extreme temperature and the other corresponding to room temperature, and for a given motor rating. It is observed that the adaptation of the driving torque is applied for the portion of the curves between 200 and 600 mm travel of the cowling sections.

It goes without saying that the invention is not limited to the single embodiment of this control system described hereinabove by way of example, but on the contrary encompasses all the variant embodiments.

The invention claimed is:
1. A system for controlling at least one actuator for cowling sections of a thrust reverser for a turbojet engine, comprising:
at least one actuator for a cowling section driven by at least one electric motor, control means for the electric motor,
wherein the control means for the electric motor comprise means for determining and/or estimating a temperature outside of the turbojet engine, the control means for the electric motor being configured for adjusting driving torque delivered by the electric motor as a function of this outside temperature, and
wherein the determination and/or estimation means comprise temperature measurement means configured for measuring a temperature at the control means, the determination and/or estimation means being configured for determining the temperature outside of the turbojet engine as a function of the measured temperature.

2. The system as claimed in claim 1, wherein the characteristic curve for adjustment by the control means of the driving torque delivered by the electric motor as a function of the outside temperature comprises a set of levels corresponding to different ranges of temperature.

3. The system as claimed in claim 2, wherein the value of the adjustment of the driving torque is determined at the start of an actuation phase for a duration of that actuation phase.

4. The system as claimed in claim 1, wherein the value of the adjustment of the driving torque is determined at the start of an actuation phase for a duration of that actuation phase.

* * * * *